United States Patent [19]
Reed

[11] 4,227,897
[45] Oct. 14, 1980

[54] APPARATUS FOR RECOVERY OF FLARED CONDENSIBLE VAPORS

[75] Inventor: Robert D. Reed, Tulsa, Okla.

[73] Assignee: John Zink Company

[21] Appl. No.: 17,378

[22] Filed: Mar. 5, 1979

[51] Int. Cl.² ............................................. B01D 53/26
[52] U.S. Cl. .................................. 55/269; 55/257 R; 165/60; 165/178; 261/151
[58] Field of Search ......... 55/80, 81, 257 R, 267–269; 261/151, 155, 156, 129, DIG. 9; 165/60, 177, 178

[56] References Cited

U.S. PATENT DOCUMENTS

| Re. 22,226 | 12/1942 | Buckley | 55/80 X |
|---|---|---|---|
| 2,712,927 | 7/1955 | Blum | 261/129 X |
| 2,768,118 | 10/1956 | Laurence et al. | 55/80 X |
| 3,129,077 | 4/1964 | Adams | 55/269 |
| 3,395,512 | 8/1968 | Finney, Jr. et al. | 55/80 |
| 3,707,066 | 12/1972 | Carne et al. | 55/269 X |
| 3,927,153 | 12/1975 | Tarhan | 261/DIG. 9 |

OTHER PUBLICATIONS

Hawley, G. G., *The Condensed Chemical Dictionary*, 8th Ed., Reinhold Co., p. 364, 1974.

*Primary Examiner*—Richard L. Chiesa
*Attorney, Agent, or Firm*—Head & Johnson

[57] ABSTRACT

An apparatus for recovery of condensible vapors as components in waste gases which are to be flared, comprising a flare system, including a flare gas line leading to a flare stack. Inserted in the flare gas line is a gas-to-liquid heat exchanger, to cool the flare gases prior to passage to the stack. The cooling is to be selected temperature, where condensible vapors in the waste gases, the dew points of which are above the selected temperature, will condense. Means are provided for separating the condensed vapors from the remaining flare gases. Thermostatic means are provided for stopping the circulation of said cooling liquid whenever the ambient temperature drops below the selected temperature.

6 Claims, 5 Drawing Figures

APPARATUS FOR RECOVERY OF FLARED CONDENSIBLE VAPORS

BACKGROUND OF THE INVENTION

This invention lies in the field of flaring and burning of waste gases. More particularly, this invention concerns means for the recovery of condensible vapors from the waste gases, prior to passage to the stack, in order to separate and recover the condensed vapors. This not only reduces the amount of gases that must be burned in the flare, but it also permits saving the condensed vapors for useful purposes.

In the prior art the general practice has been to carry the waste gases as promptly as possible to, and up a flare stack for burning. However, in view of the increasing cost of fuel, conservation of hydrocarbon chemicals is profitable, and thus some means of saving whatever condensible vapors, as may be possible, should be provided.

SUMMARY OF THE INVENTION

When vapors which are non-condensible at any ordinary temperature are emergency-vented, or relieved, to a flare system, there must be a clear, and unobstructed path for vapor or gas flow to the flare exit, for the required volume of discharge therefrom, in order for the emergency-demanded pressure relief to occur. Such vapors (gases) are not recoverable after emergency venting by any ordinary means which are tolerable in the cost-wise sense. But when flare-relieved gases (vapors) which are condensible at ordinary temperatures can be suitably cooled after relief, and before reaching the flare stack for discharge to atmosphere, they reach dew-point to become liquid, and are thus recoverable if the liquids can be suitably recovered.

It is to be noted that, as they are pressure-relieved, the gases have been heated to varying degrees, and according to process conditions from which they are relieved. These temperatures can be in excess of 600° F. (316° C.) and significant cooling is required before the vapors reach dew-point temperature. Typically, there is cooling heat loss to the metal of the flare system piping as well as radiant and convection heat loss from the surface of the flare system piping. However, this heat loss is not capable of vapor condensation unless the ambient temperature is low, as it would be in winter.

A critical flare line gas temperature for liquid condensation can be said to be 70° F. (21° C.) and such a temperature does not ordinarily occur unless the ambient temperature is significantly less than 70° F. (21° C.). Thus, flare line condensation is to be expected during approximately one-third (⅓) of the average year, or less, which results in total loss of flared condensible vapors, for approximately two-thirds (⅔) of the average year's operation of process facilities. Such a loss is prohibitive if the flared products are various hydrocarbons, which is usually the case.

Consider, for example, that the flared gas comprises hydrocarbons in a mixture of 10% each of methane, ethane, propane, butane, pentane, hexane, heptane, octane, nonane, and decane. When this mixture is relieved to a flare system, if the flared products can be brought down in temperature to approximately 70° F. (21° C.), the methane, ethane, propane, butane, and most of the pentane will continue on to flare-discharge and burning, but the hexane, heptane, octane, nonane, and decane will condense and become recoverable, to permit saving of more than 50% of the emergency-relieved hydrocarbons.

It is to be seen, therefore, that, if sufficient flared product cooling can be accomplished before the products reach the liquid removal means, at least 50% of the flare-relieved products can be recovered as a liquid. Further recovery can be made by gas temperature reduction to significantly less than 70° F., but such temperature reduction becomes so energy-demanding that it is questionable from both the energy cost and the actual conservation standpoints. A typical wet-bulb temperature is, in the order of 70° F. (21° C.). Therefore, by spray-cooling of water, a water temperature close to 70° F. (21° C.) can be obtained for heat-exchanger cooling of flared gases to approximately 70° F. (21° C.) to cause them to condense to liquids prior to the flare, and for recovery.

It is, therefore, the primary object of this invention to provide an apparatus by means of which condensible vapors, the dew points of which are above a selected temperature, can be separated and recovered from the flow of waste gases to a flare stack.

These and other objects are realized and the limitations of the prior art are overcome in this invention by provision of a gas-to-liquid heat exchanger, which is inserted into the flare gas line upstream from the flare stack.

Such a heat exchanger can, for example, be a horizontal cylindrical vessel having an entrance plenum at one end, and an exit plenum at the other end, with a pair of tube sheets and a plurality of small tubes between the two sheets, permitting the passage of waste gases from the first plenum, through the tubes to the second plenum. The space in the vessel surrounding the tubes is filled with a cooling liquid, such as water, or water plus antifreeze fluid, which is evaporation proof, such as glycerine, or a suitable glycol.

The output from the second plenum goes through a conduit which enters a vertical, cylindrical liquid separator, in a tangential manner, causing the gases to move in a swirling helical motion upwardly in the separator to exit through a conduit, inserted down through the top of the cylinder, and then to the flare stack. Means are provided for collecting the condensed liquid from the bottom of the liquid separator.

Water cooling means are provided, including a motor-driven pump, for circulating the cooling water through a set of nozzles forming a downward spray, permitting passage of air upwardly past the spray to cool the water prior to its recirculation back into the heat exchanger.

Means can be provided to force air in counterflow to the downward spray of water droplets in order to provide a greater cooling effort. Also, thermostatic means can be provided to control the rate of circulation of the cooling liquid, depending upon the ambient temperature, and also to shut down the circulation of the cooling liquid whenever the ambient temperature falls below a selected temperature, where the natural cooling of the stack gases passing through the flare gas line would condense the vapors. The liquid would continue to be separated in the liquid separator.

BRIEF DESCRIPTION OF THE DRAWINGS

These and other objects and advantages of this invention, and a better understanding of the principles and details of the invention will be evident from the follow

DESCRIPTION OF THE PREFERRED EMBODIMENT

Figure 1:
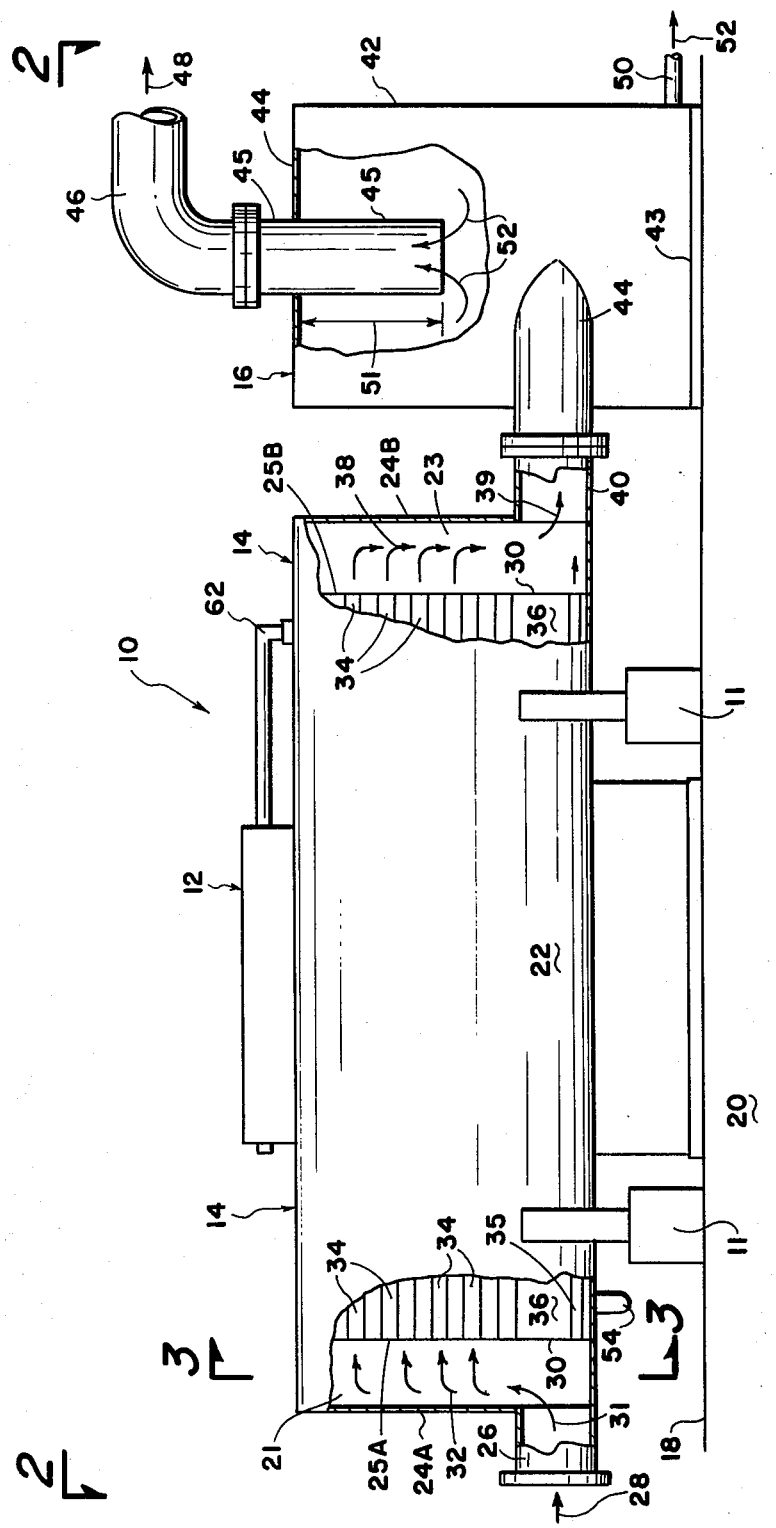
- FIG. 1 is an elevational view, partially in cross-section, of one embodiment of this invention.

Referring now to the drawings and, in particular, to FIG. 1, there is indicated generally by the numeral 10 one embodiment of this invention. It includes, principally, a gas-to-liquid heat exchanger 14, a cooling system for the liquid circulated through the heat exchanger, indicated generally by the numeral 12, and a liquid separator, indicated generally by the numeral 16.

The heat exchanger 14 comprises a horizontal cylindrical vessel 22, having an entrance end 24A and exit end 24B. The drum is supported in a conventional manner on a base 11, resting on surface 18 of the earth 20.

The waste gases from a reactor or other source arrives in accordance with arrow 28 to the inlet pipe 26 of the heat exchanger 14. It enters an entrance plenum 21, between the end wall 24A of the cylindrical vessel, and a first tube sheet 25A. There is an outlet plenum 23, at the outlet end of the heat transfer vessel 14, between the output wall 24B, and a second tube sheet 25B.

There is a large number of small diameter tubes 34 joined at their ends to the tube sheets 25A and 25B, which permit passage of the waste gases from the first plenum 21 to the second plenum 23 through the tubes. In between the tube sheets the space outside of the tubes is filled with water, or other cooling liquid. Any desired cooling liquid can be used, although it is preferred to use water or water plus anti-freeze fluid which has suitable evaporation characteristics, for obvious reasons. For convenience in describing this invention, it will be assumed that the liquid cooling medium is water.

The cooling water is supplied through a bottom inlet, by pipe 54, at the entrance end of the heat exchanger, and leaves the heat exchanger through a pipe 62, which is connected to the top of the heat exchanger at the downstream end. Both pipes 54 and 62 are connected into the water cooling section between the tube sheets.

Figure 2:
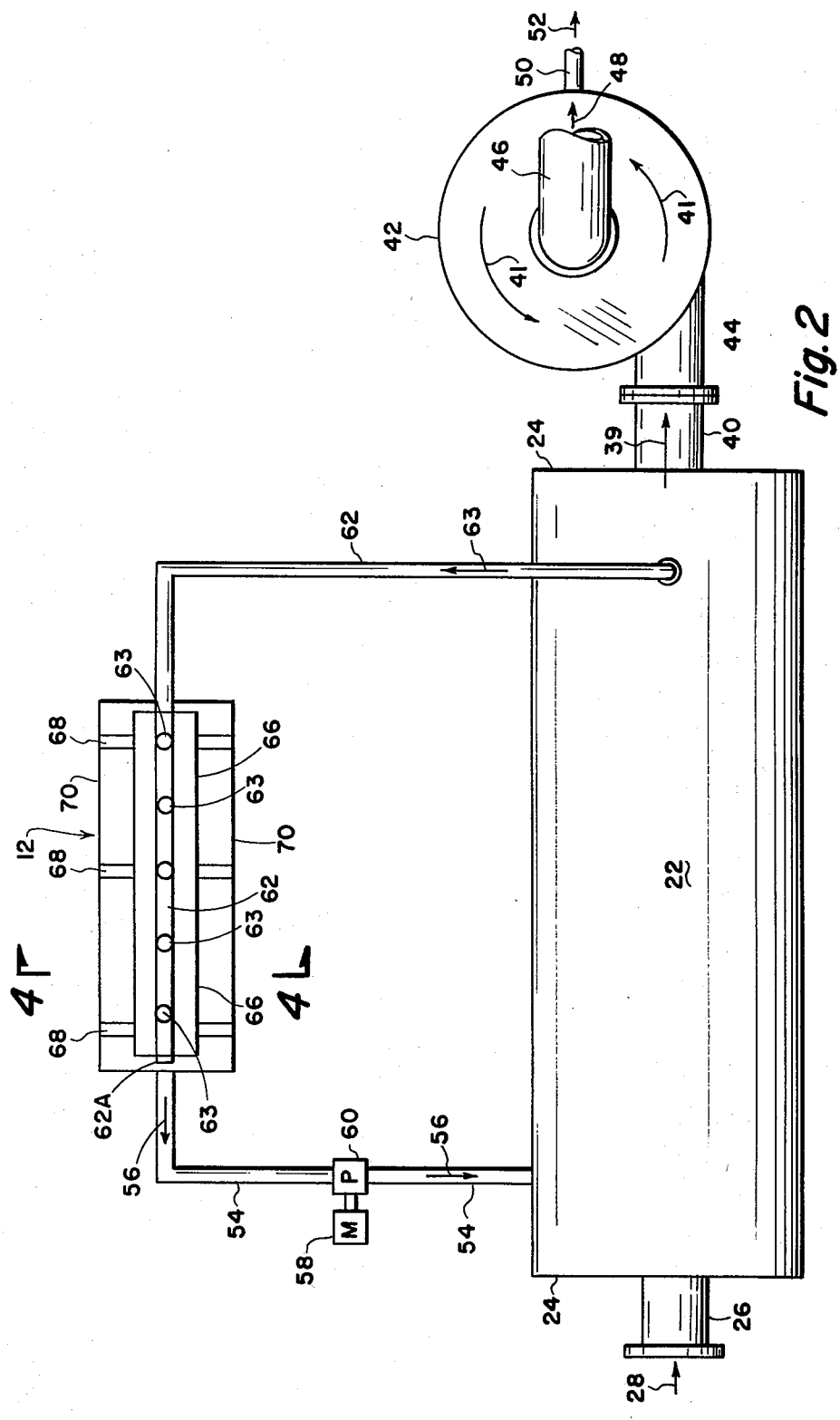
FIG. 2 is a plan view of the apparatus of FIG. 1 taken across the plane 2—2 of FIG. 1.

Referring now to FIG. 2, it will be seen that the outlet pipe carries water in accordance with arrow 63, from the top, downstream end, of the heat exchanger 22, to a cooling apparatus 12, where the heat received by the cooling water in the heat exchanger from the waste gases can be transferred to the atmosphere. This will be described in detail in connection with FIGS. 4 and 4A. The outlet of the cooling apparatus 12 goes in accordance with arrow 56, through pipe 54 to a motor 58, and pump 60. Thus, the rate of flow of water in the cooling system can be controlled to any selected value by control of the motor, for example.

Referring again to FIGS. 1 and 2, the cooled outlet gases from the second plenum 23, flowing in accordance with arrows 38, flow as arrow 39, through the outlet pipe 40, and tangentially into a vertical cylindrical gas and liquid separator through pipe 44. The liquid recovery drum 42 is supported on suitable base 43, and has a top 44, which includes a downwardly projecting axial pipe 45. The depth of penetration 51, of this pipe 45, axially downward in the separator 42 is approximately 35 to 40% of the height of the separator. This will insure that the gas which enters the open bottom of pipe 45, indicated by arrows 52, will be free of liquid droplets. All of the liquid droplets will be thrown outwardly by the whirling gases against the inner wall of the separator 42, due to the velocity of the gases entering through the pipe 44. Thus, the outlet gas, as shown by arrow 48, from the outlet pipe 46, will be gas free of liquid droplets.

Aside from the advantage of recovery of condensible vapors, it is desirable to have such a gas liquid separator, such as that described in FIGS. 1 and 2, to prevent any liquid droplets from reaching the top of the stack. Such liquid droplets would have to be revaporized before they could burn and, depending upon the size of the droplets, might not burn completely. Therefore, incomplete combustion would result with unsatisfactory results.

The operation of the described equipment in FIGS. 1 and 2 not only provides the economy, in that certain hydrocarbons that have high enough dew points can be conserved, but also it is insured that the gases flowing up the stack will be free of liquid droplets which may interfere with the smokeless combustion of the waste gases.

Figure 3:
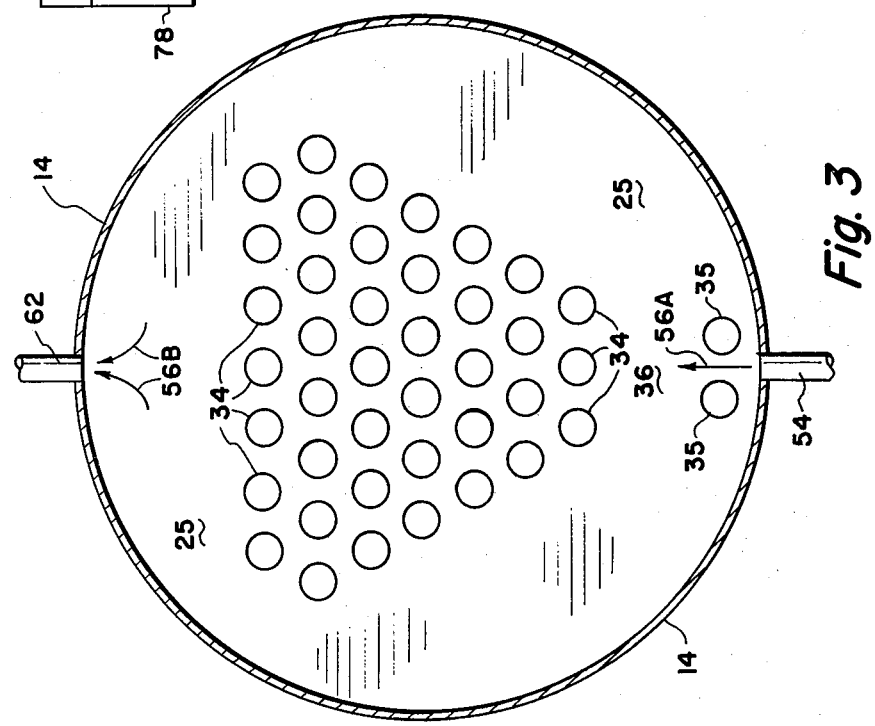
FIG. 3 is a cross-section of the heat exchanger taken across the plane 3—3 of FIG. 1.

Referring now to FIG. 3, there is shown a cross-section taken across the plane 3—3 of FIG. 1, which passes through the first plenum 21, and shows the tube sheet 25, with the plurality of gas tubes 34, through which the waste gases flow on toward the stack. Shown close to the bottom of the vessel 22 are one or more tubes 35, which are positioned for the purpose of passing any liquid that might condense in the line prior to the tube sheet 25A. Such liquid can then pass through the tubes 35 to the outlet plenum 23, and then through pipes 40 and 44, into the gas-liquid separator 42. Arrow 56A shows the upward flow of cooled water into the liquid space of the heat exchanger. Arrows 56B similarly show the passage of heated cooling water out through the outlet pipes 62, enroute to the water cooling unit 12.

Figure 4:
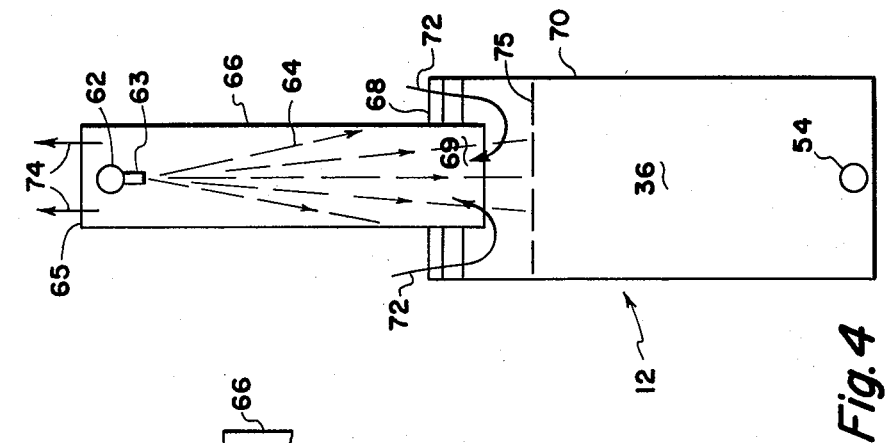
FIG. 4 is a cross-section of the liquid cooling apparatus portion of FIG. 2, taken across the plane 4—4 of FIG. 2.
Figure 4A:
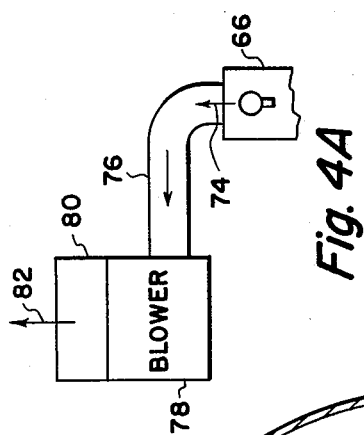
FIG. 4A is a variation of a portion of FIG. 4.

Referring now to FIGS. 4, 4A and 2, it will be seen that the water-cooling apparatus 12 comprises a rectangular tank 70, partially filled with water. Near the bottom, at one end, there is an outlet pipe which joins the pipe 54 of FIG. 2, to the pump 60 and then, in accordance with arrow 56, to the bottom inlet 54 of the heat exchanger.

The output pipe 62 is carried horizontally, colinear with the tank 70, but is supported above the water level 75 by support means 68, which are shown as beams supported on the top of the tank 70. The pipe 62 ends at 62A. It has a plurality of nozzles 63 inserted into the undersurface of the pipe 62, and spaced along the length of the pipe so that a plurality of sprays of liquid droplets 64 will be formed, and will flow downwardly in a cone onto the surface 75 of the water 36 stored in the bottom of the tank 70.

A rectangular wall of sheet metal 66 is provided, which is supported on the beams 68. This wall is open at the top and bottom and simply prevents the wind blowing against the spray water droplets, and forcing it to flow over the sides of the tank 70, rather than into the tank. In other words, the spray is guided so as to fall and circulate through the tank and through the heat exchanger. If the flow of water droplets 64 is relatively slow, then air in the bottom of the space 69 will be heated by contact with the water droplets and will rise inside of the wall 66, and will flow in accordance with arrow 72, into the bottom of the guide wall 66, and in accordance with arrows 74, out through the top 65 of the guide wall 66. This circulation will be provided because of the thermal effect on the air. However, if the velocity of the water droplets is very great, there may be an opposing flow of air entering the top 65 of the wall 66, just due to the inspiration effect of the high velocity jets of droplets. In such case it may be desirable to utilize a blower 78, such as shown in FIG. 4A, which is connected to the top of the wall 66, by means of a conduit 76. Then the heated air can be forced to flow in accordance with arrows 72 and 74 and will flow out of the blower in accordance with arrow 82.

As has been stated, the savings due to the condensing and cooling of certain hydrocarbon vapors would be dependent upon the quantity of such vapors in the waste gases. If all the gases are low dew point vapors, then it may not be profitable to utilize the equipment. On the other hand, where there is sufficient condensible vapors, then the present apparatus can be utilized to advantage.

It will be clear from the description that, when the ambient temperature surrounding the waste gas flow line is sufficiently low, the condensible gases will condense as they flow along the pipe. It may not be necessary to utilize the cooling effect of the heat transfer apparatus 12, 14. However, it would still be desirable for the waste gases to flow through the gas/liquid separator 16, to insure that there are no liquid droplets in the gases that flow up the stack.

In such cases, such as in wintertime in the northern latitudes, when the ambient temperature drops below a selected temperature, the flow rate of pump 60 can be reduced or can be stopped, thus saving power, while depending on the ambient temperature along the waste gas flow line to provide the cooling effect to condense the gases which have appropriate dew points. In such cases the motor drive 58 would be set up to be controlled by a thermostat suitably placed outdoors, or suitably inserted into a thermowell in the wall of the flow line upstream of the heat exchanger. Thus, automatically the heat exchanger will come into effect whenever the temperature of the gases rises above a selected value.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

It is claimed:

1. Apparatus for recovery of condensible vapors in waste gases which are to be flared, comprising;
   (a) a flare system including a flare gas line leading to a flare stack;
   (b) a horizontal gas-to-cooling liquid heat exchanger inserted into such flare gas line to cool said flare gases prior to passage to the stack for burning, to a selected temperature, the exchanger having a gas inlet plenum at one end and an outlet plenum at the other end;
   (c) means to cool and circulate the cooling liquid through said heat exchanger;
   whereby flare vapors, the dew points of which are above said selected temperature, will condense; and
   (d) means at the outlet end to separate the condensed vapors from the remaining flare gases; the improvement characterized by at least one tube positioned along the bottom of the heat exchanger to carry precondensed vapors in the waste gas directly from the inlet to the outlet plenum.

2. Apparatus of claim 1, the further improvement in the means to separate the condensed vapors comprising;
   a drum into which the condensed and uncondensed vapors from the outlet plenum enter tangentially, and a vapor outlet to a waste gas flare positioned axially into the drum from the top for a distance of about 35 to 40% of the height of the drum; and
   means at the bottom to withdraw condensed vapors.

3. Apparatus of claim 1, the further improvement in the inlet to the inlet plenum and the outlet from the outlet plenum are located so as to be tangent with the bottom edge of the heat exchanger.

4. Apparatus of claim 1, the further improvement in means to cool the liquid comprising;
   a long narrow rectangular tank containing cooled liquid water, an outlet therefrom to carry the cooled water via a pump to the bottom of the heat exchanger,
   a plurality of spray nozzles situated above and directed downwardly toward the level of the water, the nozzles in communication with heated water leaving from the top of the heat exchanger,
   two parallel walls on each side of the nozzles and above the level of the water to form a wind protective channel for the spray and cause an updraft of air from the bottom through the top of the channel countercurrent to the spray.

5. Apparatus of claim 4, the further improvement in a blower connected to the channel to force or draw air therethrough.

6. Apparatus of claim 1, the further improvement in the cooling liquid being protected from freezing.

* * * * *